(12) United States Patent
Smid et al.

(10) Patent No.: US 8,823,577 B2
(45) Date of Patent: Sep. 2, 2014

(54) DISTANCE SEPARATION TRACKING SYSTEM

(75) Inventors: G. Edzko Smid, Oxford, MI (US); Thomas P. Stiglich, Shelby Township, MI (US)

(73) Assignee: iTRACK, LLC, Rochester, MI (US)

( * ) Notice: Subject to any disclaimer, the term of this patent is extended or adjusted under 35 U.S.C. 154(b) by 263 days.

(21) Appl. No.: 12/974,672

(22) Filed: Dec. 21, 2010

(65) Prior Publication Data
US 2011/0148710 A1 Jun. 23, 2011

Related U.S. Application Data

(60) Provisional application No. 61/289,691, filed on Dec. 23, 2009.

(51) Int. Cl.
  *G01S 13/74* (2006.01)
  *G01S 13/08* (2006.01)
  *G01S 13/00* (2006.01)
  *G08B 1/08* (2006.01)

(52) U.S. Cl.
  USPC ........... 342/42; 342/51; 342/60; 342/118; 342/125; 342/127; 342/175; 340/539.1; 340/539.11; 340/539.13

(58) Field of Classification Search
  USPC ......... 342/27, 42, 44, 51, 118, 126, 127, 146, 342/147, 175, 378, 450, 451, 458, 461, 463, 342/464, 465; 340/539.1, 539.11, 539.13, 340/539.14, 539.15, 568.1, 573.1, 686.6
  See application file for complete search history.

(56) References Cited

U.S. PATENT DOCUMENTS

| | | | | | |
|---|---|---|---|---|---|
| 2,542,182 | A | * | 2/1951 | Crump | 342/60 |
| 3,339,202 | A | * | 8/1967 | Earp | 342/394 |
| 3,359,554 | A | * | 12/1967 | Hoffmann-Heyden | 342/50 |
| 3,460,139 | A | * | 8/1969 | Rittenbach | 342/60 |
| 3,526,895 | A | | 9/1970 | de Montlivault et al. | |
| 3,530,467 | A | * | 9/1970 | Attwood et al. | 342/102 |
| 3,530,470 | A | * | 9/1970 | Sheftelman et al. | 342/46 |
| 3,701,151 | A | * | 10/1972 | Sato et al. | 342/109 |
| 3,740,141 | A | | 6/1973 | DeWitt, Jr. | |
| 3,790,940 | A | * | 2/1974 | Becker | 342/125 |
| 3,854,133 | A | | 12/1974 | Cabion | |
| 3,931,622 | A | * | 1/1976 | Freedman | 342/42 |
| 3,984,835 | A | * | 10/1976 | Kaplan et al. | 342/44 |
| 3,996,590 | A | * | 12/1976 | Hammack | 342/465 |
| 4,110,726 | A | | 8/1978 | Dorrance et al. | |
| 4,151,525 | A | * | 4/1979 | Strauch et al. | 342/46 |
| 4,163,233 | A | * | 7/1979 | Becker | 342/125 |
| 4,278,977 | A | * | 7/1981 | Nossen | 342/42 |
| 4,307,397 | A | * | 12/1981 | Holscher | 342/125 |
| 4,315,260 | A | * | 2/1982 | Kupfer | 342/86 |
| 4,464,662 | A | * | 8/1984 | Tomasi | 342/87 |

(Continued)

*Primary Examiner* — Peter Bythrow
(74) *Attorney, Agent, or Firm* — Blue Filament Law PLLC; Avery N. Goldstein

(57) ABSTRACT

A distance separation tracking process is provided that includes the transmission of a periodic radio frequency original signal from a beacon transceiver. The original periodic signal from the beacon transceiver is received at a remote target transceiver as a target received periodic signal. The target retransmits the received periodic signal to the beacon transceiver as a return periodic signal. Data points of the return periodic signal are sampled and used to calculate a phase differential between the original periodic signal and the return periodic signal that correlates to the distance separation range between the beacon transceiver and the target transceiver.

12 Claims, 10 Drawing Sheets

(56) References Cited

U.S. PATENT DOCUMENTS

| | | | |
|---|---|---|---|
| 4,524,461 A | 6/1985 | Kostanty et al. | |
| 4,675,656 A * | 6/1987 | Narcisse | 340/539.21 |
| 4,728,955 A * | 3/1988 | Hane | 342/140 |
| 4,804,961 A * | 2/1989 | Hane | 342/125 |
| 4,809,006 A * | 2/1989 | Dar | 342/352 |
| 4,908,627 A * | 3/1990 | Santos | 342/125 |
| 5,021,794 A * | 6/1991 | Lawrence | 342/457 |
| 5,119,072 A * | 6/1992 | Hemingway | 340/573.1 |
| 5,227,803 A * | 7/1993 | O'Connor et al. | 342/442 |
| 5,264,795 A * | 11/1993 | Rider | 324/326 |
| 5,305,091 A | 4/1994 | Gelbart et al. | |
| 5,339,073 A * | 8/1994 | Dodd et al. | 340/5.61 |
| 5,424,461 A | 6/1995 | Kostanty et al. | |
| 5,499,199 A * | 3/1996 | Demas et al. | 702/158 |
| 5,525,967 A * | 6/1996 | Azizi et al. | 340/572.1 |
| 5,564,069 A * | 10/1996 | Grabow et al. | 455/47 |
| 5,592,180 A * | 1/1997 | Yokev et al. | 342/450 |
| 5,714,937 A * | 2/1998 | Campana, Jr. | 340/573.1 |
| 5,774,876 A * | 6/1998 | Woolley et al. | 705/28 |
| 6,046,683 A * | 4/2000 | Pidwerbetsky et al. | 340/10.4 |
| 6,169,485 B1 | 1/2001 | Campana, Jr. | 340/573.4 |
| 6,483,427 B1 * | 11/2002 | Werb | 340/10.1 |
| 6,580,358 B1 | 6/2003 | Nysen | 340/10.41 |
| 6,731,908 B2 | 5/2004 | Berliner et al. | |
| 6,788,199 B2 * | 9/2004 | Crabtree et al. | 340/539.13 |
| 6,812,824 B1 * | 11/2004 | Goldinger et al. | 340/10.1 |
| 6,859,761 B2 | 2/2005 | Bensky et al. | |
| 6,868,073 B1 * | 3/2005 | Carrender | 370/278 |
| 6,882,309 B2 * | 4/2005 | Bromley et al. | 342/357.64 |
| 6,906,629 B2 * | 6/2005 | Frederick | 340/572.1 |
| 6,996,406 B2 * | 2/2006 | Lection et al. | 455/457 |
| 7,010,290 B2 | 3/2006 | Dent | |
| 7,042,391 B2 * | 5/2006 | Meunier et al. | 342/464 |
| 7,119,736 B2 * | 10/2006 | Heide et al. | 342/125 |
| 7,139,581 B2 | 11/2006 | Berliner et al. | |
| 7,148,801 B2 * | 12/2006 | Crabtree et al. | 340/539.13 |
| 7,154,396 B2 * | 12/2006 | Reunamaki | 340/572.4 |
| 7,180,402 B2 * | 2/2007 | Carrender et al. | 340/10.1 |
| 7,205,931 B2 * | 4/2007 | Gila et al. | 342/127 |
| 7,260,472 B2 * | 8/2007 | Sutardja | 701/117 |
| 7,283,214 B2 | 10/2007 | Xu et al. | |
| 7,383,053 B2 * | 6/2008 | Kent et al. | 455/456.5 |
| 7,391,360 B2 | 6/2008 | Stobbe et al. | |
| 7,420,501 B2 * | 9/2008 | Perl | 342/30 |
| 7,450,024 B2 * | 11/2008 | Wildman et al. | 340/669 |
| 7,501,978 B2 | 3/2009 | Feller | |
| 7,511,604 B2 * | 3/2009 | Raphaeli et al. | |
| 7,528,711 B2 * | 5/2009 | Kates | 340/506 |
| 7,626,546 B2 * | 12/2009 | Chung et al. | 342/465 |
| 7,636,058 B2 | 12/2009 | Kamimura | |
| 7,639,174 B2 | 12/2009 | Kamimura | |
| 7,764,167 B2 * | 7/2010 | Reeves et al. | 340/426.22 |
| 7,782,194 B2 * | 8/2010 | Stawar et al. | 340/539.13 |
| 7,812,719 B2 * | 10/2010 | Djuric et al. | 340/539.13 |
| 7,924,160 B1 * | 4/2011 | LaPenta et al. | 340/572.4 |
| 7,952,363 B2 * | 5/2011 | Jones et al. | 324/544 |
| 7,983,694 B2 * | 7/2011 | Cheok et al. | 455/456.5 |
| 8,010,133 B2 * | 8/2011 | Cheok et al. | 455/456.5 |
| 8,013,781 B2 * | 9/2011 | Stockmann | 342/93 |
| 8,063,760 B2 * | 11/2011 | Volpi et al. | 340/505 |
| 8,214,147 B2 * | 7/2012 | Cheok et al. | 701/470 |
| 8,279,112 B2 * | 10/2012 | Carrick | 342/127 |
| 8,289,150 B2 * | 10/2012 | Lin et al. | 340/539.1 |
| 2002/0008615 A1 * | 1/2002 | Heide et al. | 340/426 |
| 2003/0020491 A1 | 1/2003 | Pierenkemper et al. | |
| 2003/0034887 A1 * | 2/2003 | Crabtree et al. | 340/539 |
| 2003/0036378 A1 | 2/2003 | Dent | |
| 2003/0058155 A1 * | 3/2003 | Landt | 342/42 |
| 2003/0195723 A1 | 10/2003 | Bensky et al. | |
| 2005/0007251 A1 * | 1/2005 | Crabtree et al. | 340/539.13 |
| 2005/0012653 A1 * | 1/2005 | Heide et al. | |
| 2005/0253688 A1 * | 11/2005 | Fukuda | 340/10.4 |
| 2006/0007049 A1 * | 1/2006 | Nitzan et al. | 343/904 |
| 2006/0012464 A1 * | 1/2006 | Nitzan et al. | 340/10.1 |
| 2006/0038676 A1 * | 2/2006 | Richards | 340/539.23 |
| 2006/0107307 A1 * | 5/2006 | Knox et al. | 726/2 |
| 2007/0001814 A1 * | 1/2007 | Steinke et al. | 340/10.31 |
| 2007/0155408 A1 | 7/2007 | Belcea et al. | |
| 2007/0262861 A1 * | 11/2007 | Anderson et al. | 340/539.13 |
| 2008/0018450 A1 * | 1/2008 | Volpi et al. | 340/505 |
| 2008/0103696 A1 * | 5/2008 | Cheok et al. | 701/300 |
| 2008/0129979 A1 | 6/2008 | Magnusson | |
| 2008/0143482 A1 * | 6/2008 | Shoarinejad et al. | 340/10.1 |
| 2008/0143525 A1 * | 6/2008 | Woodbury et al. | 340/547 |
| 2008/0165059 A1 * | 7/2008 | Karr | 342/378 |
| 2008/0167051 A1 * | 7/2008 | Cheok et al. | 455/456.5 |
| 2008/0180325 A1 | 7/2008 | Chung et al. | |
| 2009/0167536 A1 * | 7/2009 | Clark et al. | 340/573.4 |
| 2009/0168604 A1 | 7/2009 | Chen et al. | |
| 2009/0195438 A1 * | 8/2009 | Kawai | 342/127 |
| 2010/0277286 A1 * | 11/2010 | Burkart et al. | 340/10.34 |
| 2010/0277360 A1 | 11/2010 | Lee | |
| 2010/0321245 A1 * | 12/2010 | Aoki | 342/458 |
| 2011/0006942 A1 | 1/2011 | Kluge et al. | |

* cited by examiner

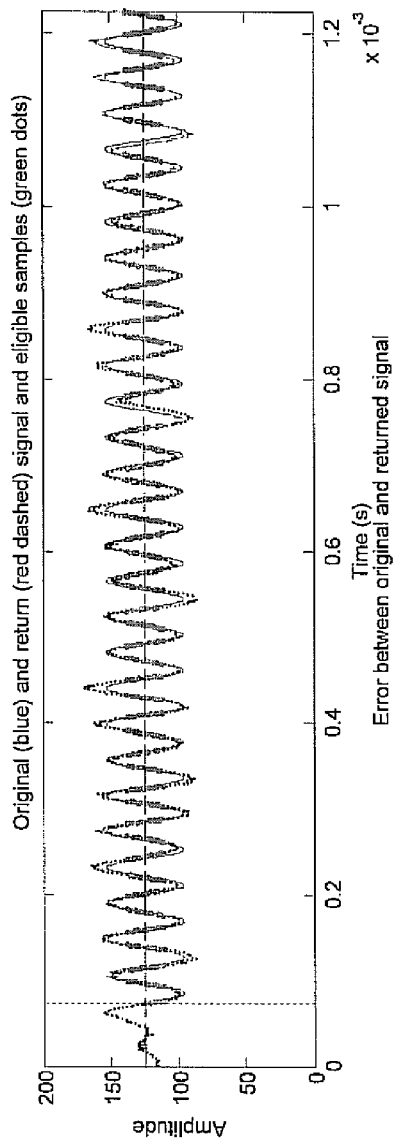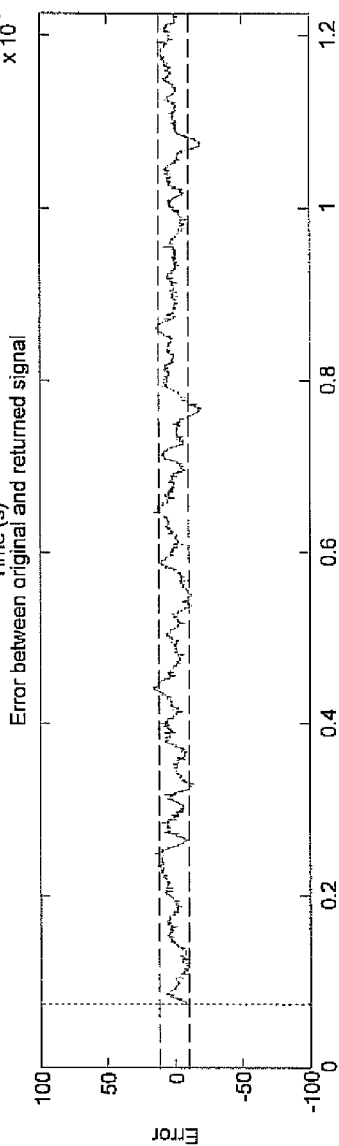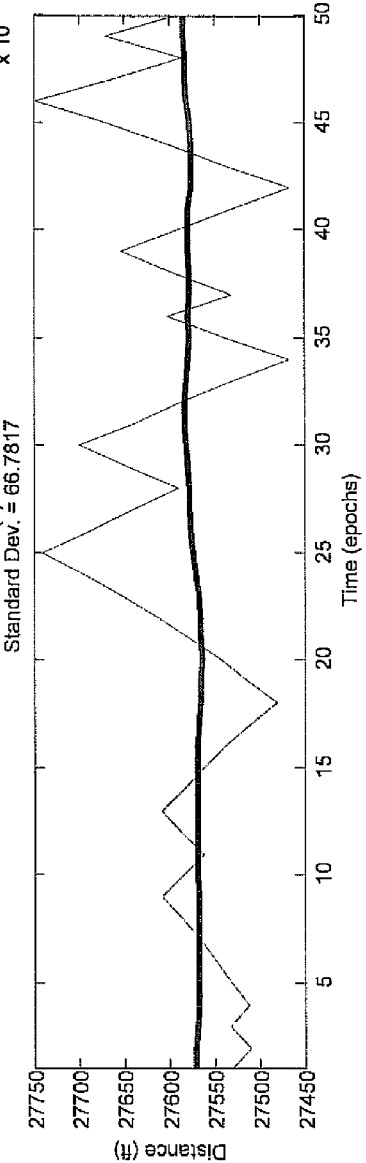
Fig. 4A
Fig. 4B
Fig. 4C

DISTANCE SEPARATION TRACKING SYSTEM

CROSS-REFERENCE TO RELATED APPLICATION

This application claims priority of U.S. Provisional Patent Application Ser. No. 61/289,691 filed Dec. 23, 2009, which is incorporated herein by reference.

FIELD OF THE INVENTION

The present invention in general relates to a process and equipment for determining the distance separation between two transceivers, and in particular to the use of a periodic wave signal completing a sent and received circuit to derive a time of flight between transceivers that is manipulated along with the known characteristics of the periodic signal to derive distance separation between the transceivers.

BACKGROUND OF THE INVENTION

A variety of endeavors require determination of distance separation between objects. Such endeavors include aeronautics, emergency responders, surveying, biology field studies, and personnel management within large organizations. Range finding to a passive target that lacks a transceiver communicative with a system transceiver has historically been accomplished with triangulation or time of flight of an interrogating optical or radar pulse to the target and back to the system transceiver. These passive range finding systems are prone to distortions when line of sight conditions do not exist and are obscured by intermediate terrain and structures through which interrogating signals cannot penetrate. Additionally, radar systems are unable to provide high resolution distance separation information with an accuracy less than the radar wavelength scale.

Distance separation has also been previously determined using two communicative transceivers. With communicative active transceivers, distance separation is either calculated by absolute or relative techniques with absolute techniques utilizing distances or angles to known reference locations to calculate a target position. Exemplary of such absolute techniques are global positioning satellite (GPS) based systems, triangulation methods, and trilateration. In contrast, relative tracking involves a larger mobile unit that is tracked precisely in absolute coordinates using GPS or other tracking technologies while the actual target is then tracked with respect to the intermediate target. Regardless of the specifics, existing absolute and relative tracking techniques have all suffered from one or more of the following shortcomings including large transceiver size and power consumption, the requirement of clock synchronization that is vulnerable to air and disruption, limited penetration through land masses and/or manmade structures, or complexity of calculation. Attempts to add a distance separation tracking functionality onto existing communication devices that operate from 0.9-100 gigaHertz and in particular to industrial, scientific, and medical (ISM) 2.4 gigaHertz protocols have compounded these difficulties.

Thus, there exists a need for a distance separation tracking system that provides absolute positioning between system transceivers without reliance on external GPS interaction, gigaHertz wave propagation between system transceivers, or clock synchronization therebetween that have confounded prior art distance separation tracking processes. There further exists a need for a system that is amenable to being placed in a collar or otherwise carried by a human or other mammal or object desirous of being tracked.

SUMMARY OF THE INVENTION

A distance separation tracking process is provided that includes the transmission of a periodic radio frequency original signal from a beacon transceiver. The original periodic signal from the beacon transceiver is received at a remote target transceiver as a target received periodic signal. The target retransmits the received periodic signal to the beacon transceiver as a return periodic signal. Data points of the return periodic signal are sampled and used to calculate a phase differential between the original periodic signal and the return periodic signal that correlates to the distance separation range between the beacon receiver and the target transceiver. In some embodiments sampling data points of the returned periodic signal occur at a sampling rate at least twice the frequency of the original signal.

A distance separation tracking process is also provided based upon a master beacon transceiver that has a known position. The above-detailed process is otherwise repeated to afford a point of reference for the distance separation range. With a known position transmitter or master beacon, the calculated distance separation range is used in an absolute reference frame positioning system.

BRIEF DESCRIPTION OF THE DRAWINGS

Numerous aspects of the present invention are better understood with reference to the following drawings that constitute part of the specification. Components depicted in these drawings are not necessarily to scale and instead are provided to emphasize operational principles of the present invention. Throughout these drawings, like reference numerals designate corresponding elements throughout the various figure views.

FIGS. 4A-4C are plots of data capture and processing according to a first embodiment of the present invention. FIG. 4A is a plot of outward (solid) and returned (dashed) signals produced by a working example of the present invention with sampling points depicted as points. FIG. 4B depicts the error as a function of time derived from the sampling points of FIG. 4A. FIG. 4C depicts a plot of distance separation based on estimated distance separation and a best fit average filter of the estimated distance separation;

DESCRIPTION OF THE INVENTION

The present invention has utility as a process and system for determining distance separation between a first transceiver and a second transceiver with a high degree of accuracy in spite of intermediate obstructions and without reliance on GPS, fixed reference signals, or line of sight. Through resort to outward broadcast and collected return of a mathematically well defined and constant signal, the return signal has a time delay shift associated directly with the distance traveled; and most importantly, signal distortion during transit is readily removed through selection of a periodic signal having a frequency of between 10 and 2,400 kiloHertz and preferably between 20 and 800 kiloHertz, and most preferably between 25 and 300 kiloHertz. The periodic signal has a desirable set of characteristics as to differing structure penetration, allowance for a rapid sampling rate to achieve a good signal-to-noise ratio for subsequent sampling, available inexpensive and robust hardware components, and highly accurate distance separation determination. It is appreciated that use of a periodic signal in this frequency range also achieves greater operational range as compared to systems operating on the ISM or other higher frequency standards. Further, by removing the necessity for clock synchronization between transceivers, the more robust and accurate distance separation is achieved.

As used herein the term "beacon transceiver" or "beacon" is used to indicate a transceiver from which distance is measured. A "target transceiver" or "target" is a transceiver or receiver whose distance is measured from a beacon transceiver. Each transceiver optionally includes a receiver and a transmitter.

An inventive distance separation tracking process uses a hardwired loop-backed connection in the target to receive the outward signal transmitted from a beacon to rebroadcast the signal as a return signal thereby eliminating phase distortion or the need for clock synchronization that have plagued prior art systems.

Figure 1A:
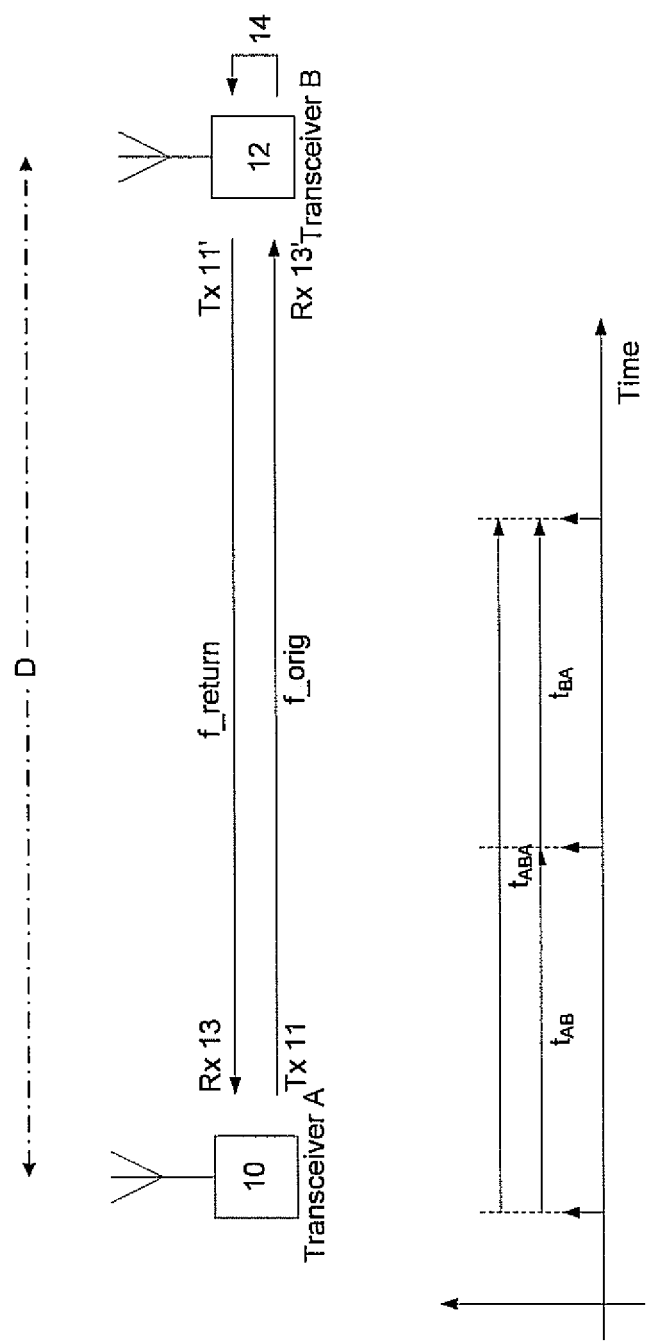
FIG. 1A is a diagram depicting periodic signal path between a first transceiver denoted as transceiver A (beacon) and a second transceiver denoted as transceiver B (target) along with a plot of time of arrival for segments A→B, $t_{AB}$, B→A, $t_{BA}$, and total path A→B→A, $t_{ABA}$ from which a time of arrival (TOA) is calculated to determine distance separation.

An inventive process for distance separation tracking is provided schematically in FIG. 1A and includes a first transceiver, synonymously denoted as transceiver A (beacon) at 10. Transceiver A broadcasts a periodic frequency signal across an unknown distance separation D to a second transceiver, synonymously denoted as transceiver B (target) at 12. Transceiver B 12 has a hardwired loop 14 between receiver 13' and a transmitter 11' within the transceiver 12. The transmitter 11' rebroadcasts the periodic frequency signal received by way of receiver 13' and hardwired loop 14 and through rebroadcast periodic frequency signal $f_{return}$ is collected at receiver 13 of beacon transceiver 10. The periodic frequency signal $f_{orig}$ is selected to have a waveform that is modeled accurately by a mathematical formula. Illustrative of various waveforms for the periodic frequency signal $f_{orig}$ are sine wave, square wave, triangle wave, and sawtooth. Preferably, the original periodic frequency signal $f_{orig}$ is a waveform that has only a single variable, and maximizes the available channel bandwidth utilization. A sine wave represents a preferred waveform for the original periodic frequency signal $f_{orig}$. A calculation of the distance separation D between beacon transceiver 10 and target transceiver 12 is derived from time delay of the return signal $f_{return}$ relative to the transmitted signal $f_{orig}$ from 10. Through the use of a periodic frequency signal with a short wavelength as compared to the rate of change in distance separation between beacon transceiver 10 and target transceiver 12, the distance separation D is treated as a constant during the sampling of return signal $f_{return}$. As a result, the time for signal $f_{orig}$ to travel from transmitter 11 to receiver 13' is denoted schematically as $t_{AB}$ of the time associated with the return signal transit from receiver 13' through hardwire loop 14 to transmission from transmitter 11' to receiver 13 is denoted schematically in FIG. 1A as $t_{BA}$ while the complete round trip transit of signals $f_{orig}+f_{return}$ is denoted as $t_{ABA}$.

While an inventive process is depicted with a single beacon transceiver 10 and a single target loop-backed transceiver 12 for visual clarity to simply illustrate the mode of operation of an inventive distance separation tracking process, it is appreciated that a more complex system is readily produced with multiple beacon transceivers 10 and/or loop-backed target transceivers 12 upon provision of separate channels within each such transceiver 10 or 12, and each beacon transceiver 10 broadcasting a periodic frequency signal $f_{orig}$ at different channels such as by different waveform, period, or combination thereof. In this way, multiple distance separations are simultaneously calculated. It is further appreciated that the same channels may be used by multiple loop-backed target transceivers, and that the loopback in each transceiver is activated only when the loop-backed transceiver receives a signal $f_{orig}$ from the beacon initiating transceiver with a specific frequency or waveform, uniquely indicating a request from the specific loop-backed target transceiver. Multiple transceivers may use the same channels for receiving and transmitting the frequency signal, assuming that the chance of signal collision is relatively small. For example, with 100 transceivers requesting 1 measurement per second, and the duration of each measurement being 1 ms, there is a 10% chance of collision. It is further appreciated that plotting distance separation onto a terrain map or building floor plan allows for highly accurate monitoring of distance separation tracking in actual space with the distance separation tracking being robust and able to operate through quantities of geologic structure or through manmade structures. As a result, an inventive system is considered to be particularly useful in tracking the relative position of first responders, miners, and mobile equipment operating within an environment such as submersibles, robots, drilling components, roving service equipment, and the like. Additionally, it is appreciated that a conventional two-way radio system is readily modified to transmit a periodic frequency signal as a signal packet as a disruption on an audio channel to provide a distance separation capability, A typical periodic frequency signal is of a duration that is barely perceptible to a listener. Typical packet duration is 0.1 to 10 milliseconds. In the event that a two-way radio user perceives a sound "pop" associated with the periodic frequency signal packet, the timing of the packet transmission is optionally at random times to make the perception of the packet similar to that of random noise.

Figure 1B:
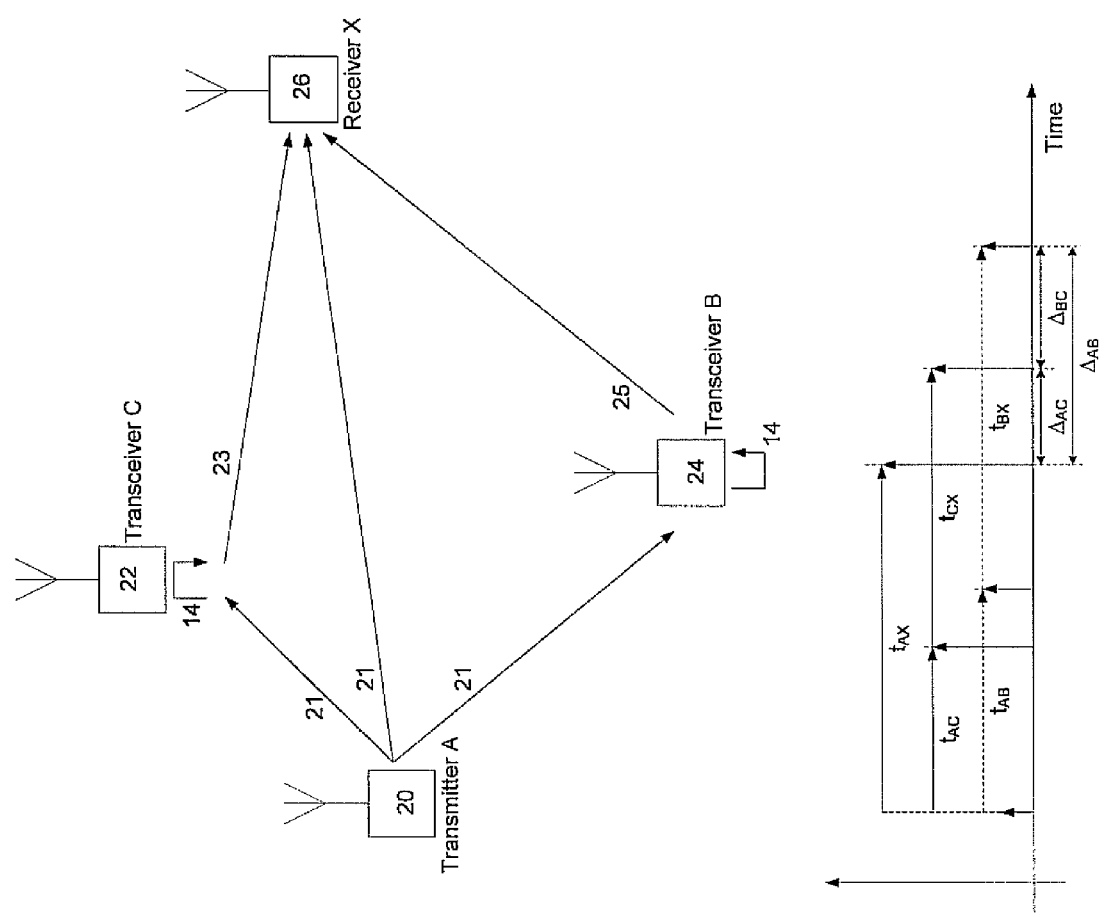
FIG. 1B is a diagram of a multiple transceiver embodiment in which a target receiver X need not retransmit a received signal to determine distance separate to transmitter A and transceivers B and C.

As illustrated in FIG. 1B, the present invention is also operative with a master transmitter 20 transmitting a periodic original frequency signal 21 ($f_{master}$) to one or more loop-backed beacon transceivers 22 and 24 which in turn broadcast the periodic original signal as a retransmitted original signal ($f_{orig}$) 23 and 25 to a receiver 26. Receiver 26 receives one or more signals $f_{orig}0 \ldots f_{orig}n$ where n corresponds to the number of periodic frequency signals so received by the receiver. The receiver 26 then uses time difference of arrival (TDOA) to derive distance separation to the broadcasting transmitter and transceivers. The receiver may use a polling method to switch channels, in order to conduct a TDOA distance measurement with different combinations of signals from different transmitters and transceivers. For example, receiver 26 may select channel A for transmitter A and channel B for transceiver B, so that a distance measurement is calculated using the TDOA between signals from transmitter A and transceiver B. Or receiver 26 may select channel A for transmitter A and channel C for transceiver C, so that a distance measurement is calculated using the TDOA between signals from transmitter A and transceiver C. Time difference of arrival calculation protocols are well known (Ref. 1-10). It is appreciated that in an inventive embodiment including a master transmitter 20 which broadcasts a signal to a beacon transceiver 22 which in turn rebroadcasts the periodic signal $f_{orig}$ to a target receiver 26 is particularly well suited for use with multiple targets as each target receiver need not include a transmitter and instead with additional channels for separately receiving the signal from master transmitter 20, $f_{master}$ and the rebroadcast form thereof $f_{orig}$, distance separation at target receiver 26 is readily determined without the need for target retransmission of a received signal. Since in this configuration, the target is only receiving, the system is well suited for scaling up to a large number of moving targets, without increased occupation of the channel bandwidth.

By way of example, master transmitter A transmits a signal on channel A. Beacon transceiver B receives the signal from master transmitter A on channel A and retransmits the signal on channel B. Similarly, beacon transceiver C receives the signal from master transmitter A on channel A, and retransmits it on channel C. Now, a receiver X may scan channels A, B and C for signals from master transmitter A, and beacon transceivers B and/or C. Assuming that receiver X knows the coordinates of the master transmitter and beacon transceivers, it can use the time difference of arrival (measured from the phase difference in the channel data) to determine relative position to the transmitter and transceivers. This inventive embodiment is shown schematically in FIG. 1B. This embodiment has the advantage over prior systems at least due to the signal loop-back (therefore not requiring synchronization) and the use of a math signal.

Figure 2:
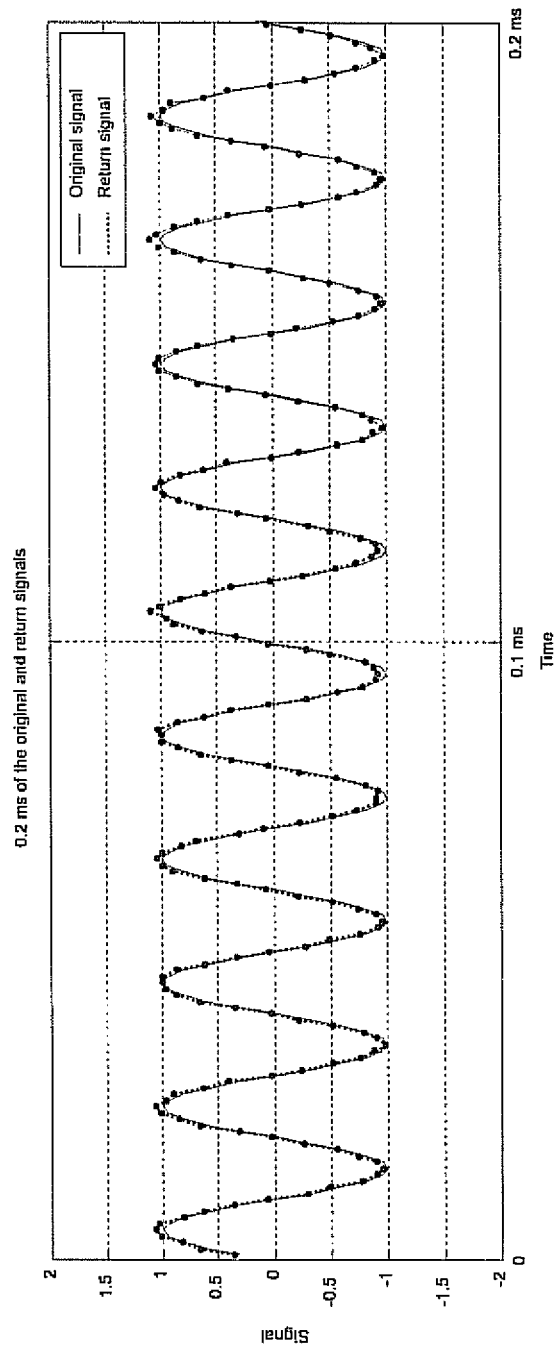
FIG. 2 is a plot of a simulated 50 kHz sine wave outward signal A→B, overlaid with return signal B→A based on a sampling period of 1 microsecond, a 0.2 millisecond sampling frame (200 samples), and a 5% random amplitude noise addition on the return signal.

To illustrate properties of distance separation according to the present invention, a 50 kiloHertz sine wave free of distortion is used to simulate a periodic frequency signal. A return signal is simulated that includes 5% random amplitude noise added to the original signal as $f_{return}$. A sample period of 1 microsecond is used along with a 0.2 millisecond frame length. The resultant sine waves of the original and return signals as well as the sampling points are depicted schematically in FIG. 2 at a distance separation between beacon transceiver 10 and target transceiver 12 of 10 feet.

The original signal is a sine wave as in $$f_{orig} = A + B \sin(\omega t) \qquad (1)$$

and the return signal is shifted in time due to the delay caused by the traveled distance $$f_{return} = A + B \sin(\omega(t+\delta t)) = A + B \sin(\omega t + \omega \delta t) = A + B \sin(\omega t + \lambda) \qquad (2)$$

Since the time delay relates to the traveled range as $$\delta t = \frac{R}{C_0}$$

where $C_0$ is the speed of light, the distance range D, separation as a function of the phase delay $\lambda$ between the original and return signal is $$D = \frac{\lambda}{\omega} C_0 \qquad (3)$$

where $\omega$ is the angular frequency.

Figure 3:
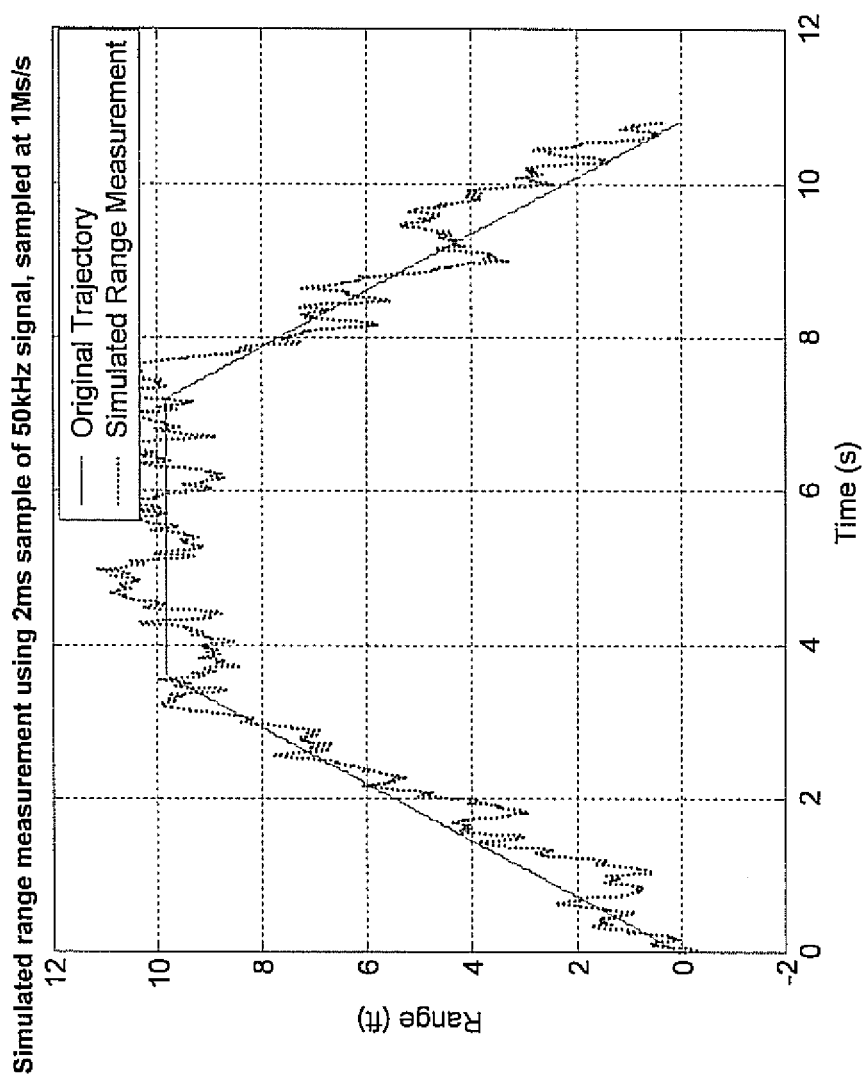
FIG. 3 is a plot of distance separation (range) as a function of time for a 50 kHz outward sine wave signal based on a sampling period of 1 microsecond, 2 millisecond sampling frames (2000 samples), and a 5% random amplitude noise addition on the return signal to derive a simulated distance separation.

FIG. 3 illustrates a plot of a distance separation as a function of time for a 50 kiloHertz outward sine wave signal sampled over 2 millisecond frame lengths at a sampling period of 1 microsecond (2000 sample points) based on an optimal fit for Equation 3 accurately returns a simulated range measurement based on a 10 foot separation between beacon transceiver and target transceiver simulated to have an actual separation of 10 feet.

A multiple channel transceiver operative in the present invention is readily available commercially that only requires that each transceiver channel have a frequency bandwidth for each channel such that disparate channels do not have frequency overlap. By way of example, as periodic frequency signals are on the order of kiloHertz and sampling rates on the order of megaHertz, channel specifications are readily detailed. By way of example, assuming a channel center frequency for a first channel of 31 megaHertz and a periodic original signal having a frequency of 75 kiloHertz, channel 1 needs a range of 31 megaHertz±75 kiloHertz. A second channel centered at 31.5 megaHertz, third channel centered at 32 megaHertz, a fourth channel centered at 32.5 megaHertz, readily allows for multiple channel simultaneous communication without interference therebetween.

Figure 5:
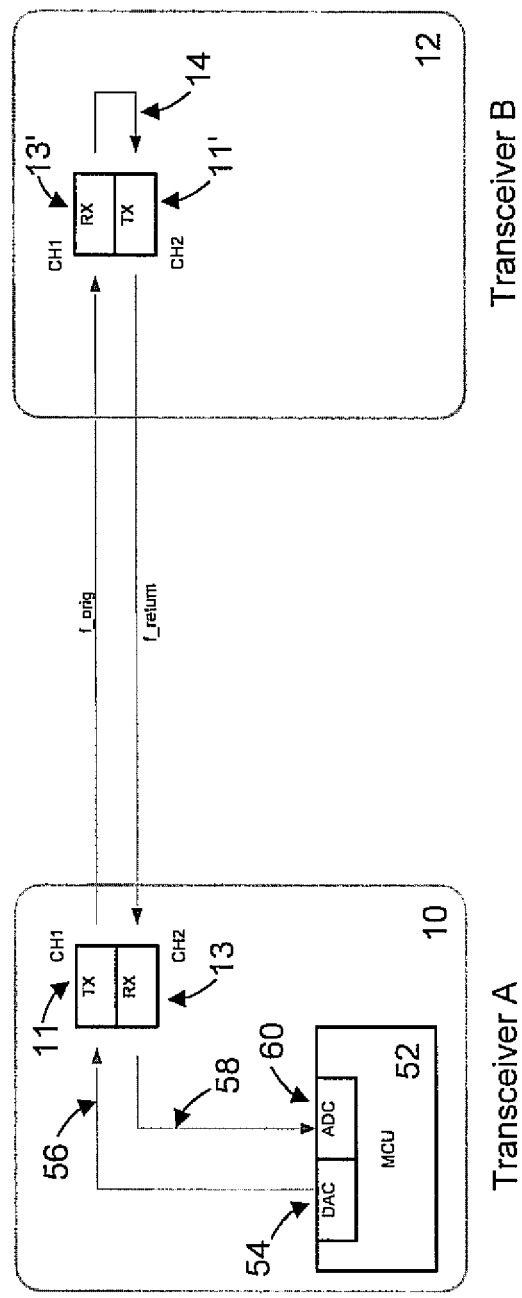
FIG. 5 is a diagram of hardware with two channel transmitter/receiver (Tx/Rx) transceiver A (beacon) and transceiver B (target)
Figure 6A:
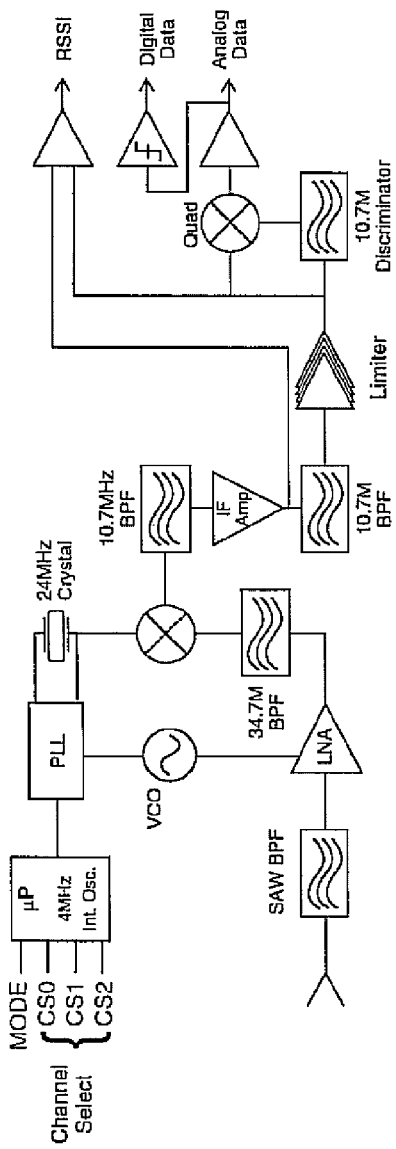
FIG. 6A is a block diagram of a prior art receiver operative in a beacon or target transceiver of the present invention.
Figure 6B:
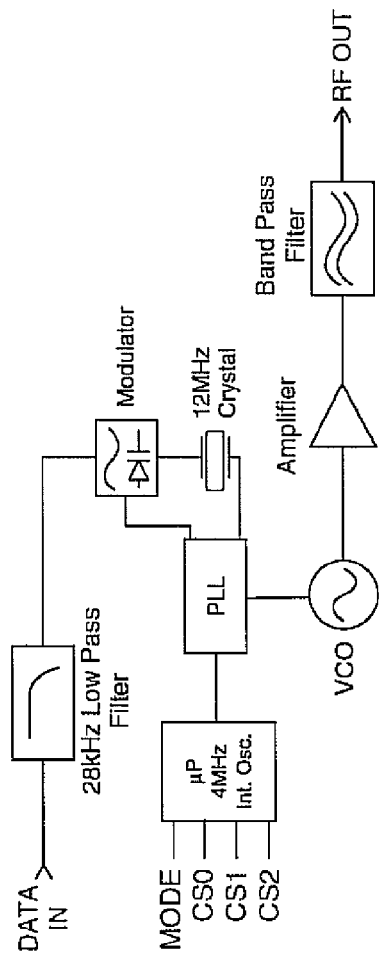
FIG. 6B is a block diagram of a prior art transmitter operative in a beacon or target transceiver of the present invention.

With respect to hardware appropriate for implementing an inventive distance separation tracking process, a schematic is provided in FIG. 5 that adds detail with respect to the beacon transceiver 10 of FIG. 1. The beacon transceiver 10 has a microcontroller (MCU) 52 that generates a periodic signal which is fed to a digital-to-analog converter (DAC) subcircuit 54. The processed periodic signal leaving the DAC 54 is denoted at 56 and is sent to transmitter 11 which transmits $f_{orig}$ on channel 1 in the example provided of FIG. 5. It is appreciated that the numerical numbering of channels is wholly arbitrary. Receiver 13' of target transceiver 12 receives $f_{orig}$ that after passing through hardwired loop 14 rebroadcasts $f_{return}$ with transmitter 11' on channel 2 as $f_{return}$. $f_{return}$ is received by receiver 13 on channel 2 with the received signal 58 communicated to an analog-to-digital converter (ADC) subcircuit 60 within the microcontroller 52. Commercially available receiver and transmitter block diagrams available as prior art are shown respectively at FIGS. 6A and 6B and are noted to be operative herein as receivers 13 or 13', or transmitters 11 or 11'. Preferably, direct access to analog signal input of the transmitter and analog output of the receiver is provided. It is appreciated that analog signals that do not pass through analog-to-digital or digital-to-analog converters or filters are free from possible phase delays, distortion, or time quantization errors created by such devices. It is also preferred that a multiple channel embodiment depicted in FIG. 1B has switching and locking properties between various channels on the order of milliseconds. By way of example, in instances when the periodic signal has a frequency of between 20 and 700 kiloHertz, switching and locking between channels occurs in less than 5 milliseconds and preferably less than 2 milliseconds. To further improve return signal sampling and distortion elimination, an inventive receiver 13 provides a value for signal strength to master controller 52. It is appreciated that the inventive system as detailed in FIG. 5 is particularly well suited for rendering transceivers 10 and 12 in compact and lightweight form amenable to being hand held or as an attachment to apparel of a human or further miniaturized for attachment to other mammals.

Figure 7A:
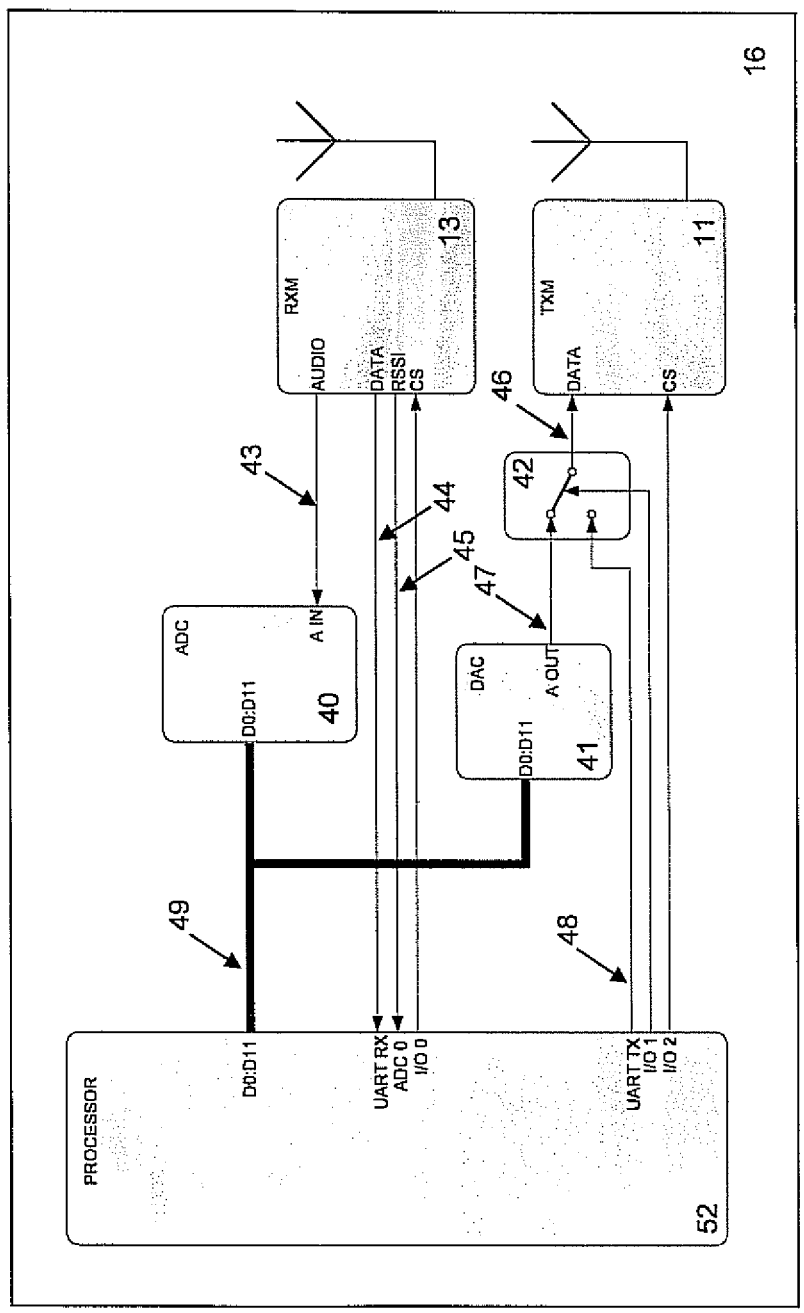
FIG. 7A is a hardware diagram of a first embodiment of transceiver A according to the present invention.

FIG. 7A provides a hardware beta diagram for beacon transceiver 10 as shown in schematic form in FIG. 5. In this instance, the ADC 40 and DAC 41 are external to the processor 52. The receiver module 13 communicates analog audio signals 43 via its audio output to the analog input of the ADC 40 which are then converted to a digital format by the ADC 40 and communicated to the processor 52 via the digital data bus 49. The receiver module 13 is also capable of decoding the incoming audio signal into a serial digital signal 44 which it communicates to the processor 52. The receiver module 13 also communicates a signal 45 corresponding to the signal strength of the received signal 43 to the processor 52. The processor 52 sends digital audio data to the transmitter module 11 via the digital data bus 49. The digital data is converted to analog data by the DAC 41. The analog output 47 of the DAC is then routed through the switch 42 appearing as the signal 46 and communicated to the transmitter module 11. Alternately, the processor 52 may communicate serial digital data 48 to the transmitter module 11 via the switch 42.

Figure 7B:
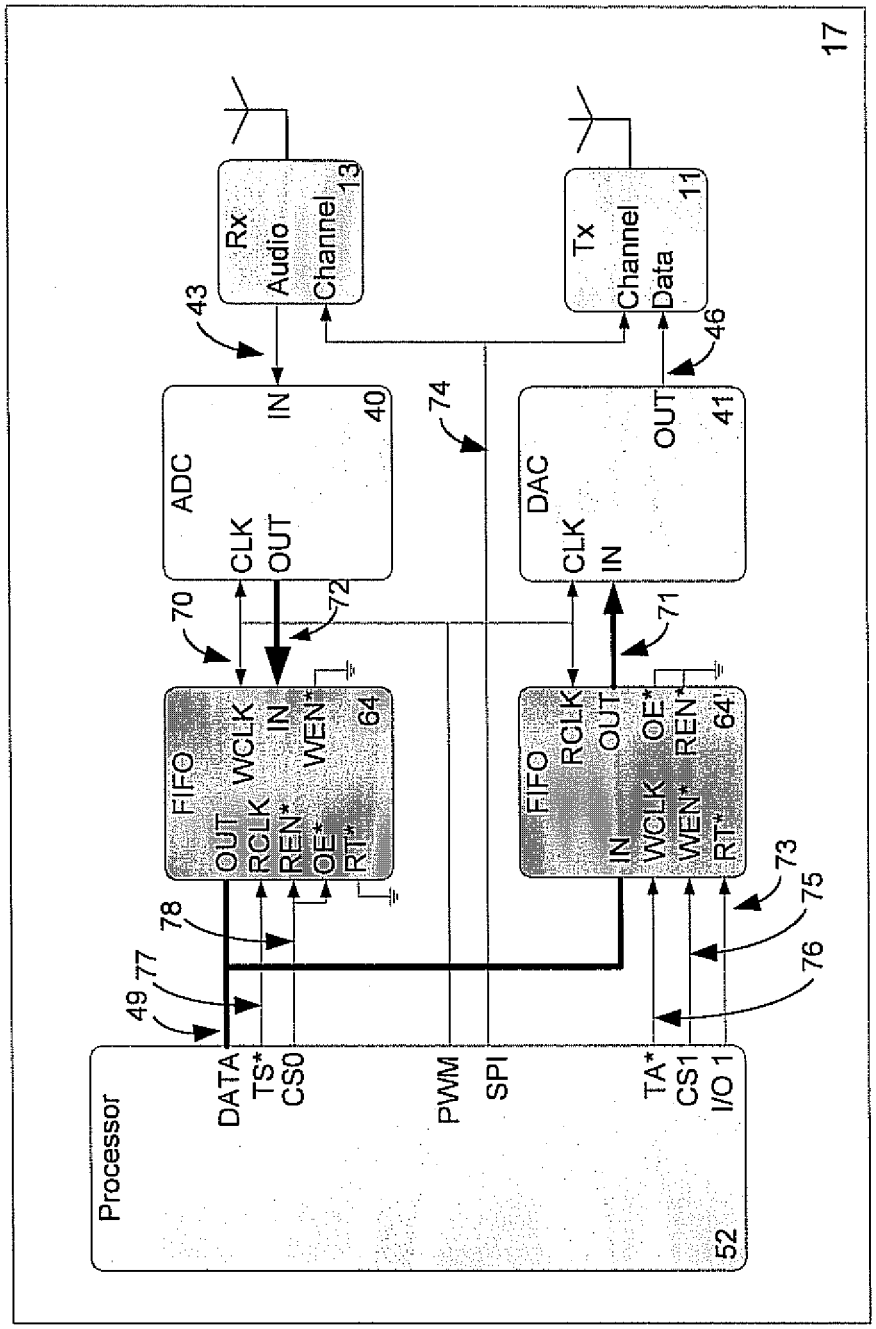
FIG. 7B is a hardware diagram of a second embodiment of transceiver A according to the present invention wherein this embodiment is used to measure distance using Time Of Arrival (TOA)

FIG. 7B provides a hardware beta diagram for beacon transceiver 10 as shown in schematic form in FIG. 5. In this instance, the ADC 40 and DAC 41 are external to the processor 52 and utilize first-in first-out buffers (FIFO's) to communicate with the processor. The processor 52 writes data to be transmitted to FIFO 64' via the data bus 49 with properly configured interface lines 73, 75, 76, 77 and 78. Transmission and reception of data occur simultaneously. The processor 52 initiates transmission of data by properly configuring interface lines 73, 75, 76, 77 and 78 while providing a clock signal 70 to FIFO 64' and DAC 41. Clock signal 70 enables the signal previously stored in the FIFO 64' to be driven into the DAC 41. Clock signal 70 transfers data from FIFO 64' to DAC 41 which DAC 41 converts to an analog signal 46 provided to the transmitter 11. The receiver 13 provides an analog signal 43 to the ADC 40 which is converted to a digital signal 72 when driven by clock signal 70. Clock signal 70 also clocks digital signal 72 into FIFO 64. Processor 52 then reads stored digital signal 72 from FIFO 64 via data bus 49. A serial peripheral interface 74 provides a means to accommodate channel switching of receiver 13 and transmitter 11.

Figure 7C:
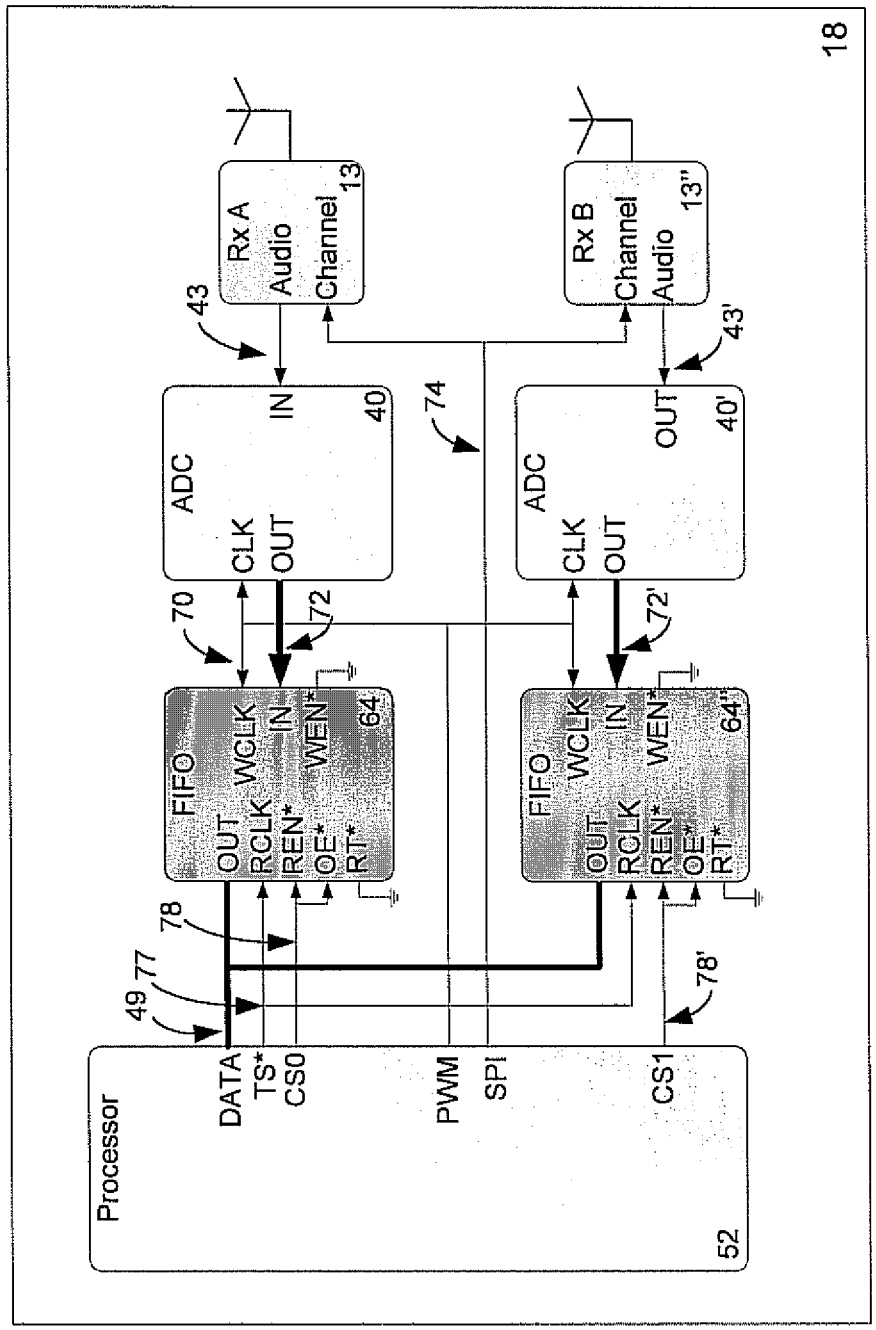
FIG. 7C is a hardware diagram of an embodiment of receiver X according to the present invention used to measure distance using Time Difference Of Arrival (TDOA).

FIG. 7C provides a multiple receiver channel version of the invention, as for example, might be used in the system detailed with respect to FIG. 1B. Duplicate receiver and corresponding ADC are designated as 13" and 40', respectively, and otherwise share the characteristics of the unprimed versions of these numerals. In this inventive embodiment of a ranging transceiver, FIFO 64 and 64" provide intermediate signal communications between ADCs 40, 40' and the microcontroller 52. A serial peripheral interface 74 provides a means to accommodate channel switching of the receivers 13 and 13"

Based on straightforward theoretical mathematics underlying distance separation calculation as provided by Equations 1-3, a distance separation is readily calculated by a variety of data analysis protocols conventional to the art that illustratively include statistical phase delay values derived from each data point such as average or medium, regression fitting, combinatorial optimization, random optimization, and stochastic approximation and quadratic optimization routines. In a preferred embodiment, calculation of distance separation D is obtained through an inventive optimization process that involves using sampling points of $f_{return}$ centered around the periodic signal time axis and in particular with respect to a sine wave around the points of inflexion. This is depicted graphically in FIG. 4A where $f_{orig}$, $f_{return}$ and eligible sampling points of $f_{return}$ are overlapped. Within the context of the present invention, it has been discovered that extrema sampling points of a sine wave and edge points of other periodic waves offer the greatest degree of distortion between $f_{orig}$ and $f_{return}$. This is in fact observed in FIG. 4A. Based on the eligible sampling points of FIG. 4A, error plotted between $f_{orig}$ and $f_{return}$ and a filtering window is applied to the error data to provide an error band that discards, for example, the extreme 5%, 10%, 15%, 20%, etc. of the error band from subsequent calculations used to derive a distance separation D. After error band filtering, a calculated and filtered distance is provided in FIG. 4C. By applying a slow moving average filter to this calculated and filtered distance calculation, a highly accurate distance separation value is obtained. Preferably, the rate of change of the average filter is communicated as part of the data analysis routine to the error band filtering function to modify error bandwidth and percentage of extreme point discard to provide stability to the average filter value of the calculated and filtered distance obtained in FIG. 4C.

The present invention is further detailed with respect to the following nonlimiting example. The beacon transceiver of FIG. 7A generated a sine wave $f_{orig}$ having a frequency of 22 kiloHertz as depicted in FIG. 4A. The signal $f_{orig}$ is broadcast and received by a target transceiver having hardwired looped receiver and transmitter components per FIGS. 6A and 6B with a signal $f_{return}$ being received with the beacon transceiver as shown in FIG. 4A. Upon calibration for electronics time lag and environmental transmission conditions and then applying a data analysis protocol as detailed with respect to FIGS. 4A-4C, a distance calculation within 1% of the known distance is obtained.

References

[1] J. S. Abel, "A Divide and Conquer Approach to Least-Squares Estimation," IEEE Transactions on Aerospace and Electronic Systems, vol. 26, pp. 423-427, March 1990.

[2] J. S. Abel and J. O. Smith, "The Spherical Interpolation Method for Closed-Form Passive Source Localization Using Range Difference Measurements," Proceedings of ICASSP-87 (Dallas, Tex.), pp. 471-474.

[3] Y. T. Chan and K. C. Ho, "A Simple and Efficient Estimator for Hyperbolic Location", IEEE Transactions on Signal Processing, vol. 42, no. 8, pp. 1905-1915, August 1994.

[4] B. T. Fang, "Simple Solutions for Hyperbolic and Related Fixes", IEEE Transactions on Aerospace and Electronic Systems, vol. 26, no. 5, pp. 748-753, September 1990.

[5] W. H. Foy, "Position-Location Solutions by Taylor-Series Estimation," IEEE Transactions on Aerospace and Electronic Systems, vol. AES-12, pp. 187-194, March 1976.

[6] B. Friedlander, "A Passive Localization Algorithm and its Accuracy Analysis," IEEE Journal of Oceanic Engineering, vol. OE-12, pp. 234-245, January 1987.

[7] H. C. Schau and A. Z. Robinson, "Passive Source Localization Employing Intersecting Spherical Surfaces from Time-of-Arrival Differences," IEEE Transactions on Acoustics, Speech and Signal Processing, vol. ASSP-35, pp.1223-1225, August 1987.

[8] J. O. Smith and J. S. Abel, "The Spherical Interpolation Method for Source Localization", IEEE Journal of Oceanic Engineering, vol. OE-12, no. 1, pp. 246-252, January 1987.

[9] J. O. Smith and J. S. Abel, "Closed-Form Least-Squares Source Location Estimation from Range-Difference Measurements," Transactions on Acoustics, Speech and Signal Processing, vol. ASSP-35, pp. 1661-1669, December 1987.

[10] D. J. Torrieri, "Statistical Theory of Passive Location Systems," IEEE Transactions on Aerospace and Electronic Systems, vol. AES-20, pp. 183-198, March 1984.

Patent documents and publications mentioned in the specification are indicative of the levels of those skilled in the art to which the invention pertains. These documents and publications are incorporated herein by reference to the same extent as if each individual document or publication was specifically and individually incorporated herein by reference for the entirety of its teaching.

The foregoing description is illustrative of particular embodiments of the invention, but is not meant to be a limitation upon the practice thereof. The following claims, including all equivalents thereof, are intended to define the scope of the invention.

The invention claimed is:

1. A distance separation tracking process comprising:
    transmitting a periodic radio frequency original signal from a beacon transceiver as a signal packet as a disruption on an audio channel of a radio system to provide the distance separation tracking capability, said original signal being defined by a mathematical equation;
    receiving the original periodic signal from said beacon transceiver at a remote target transceiver as a target received periodic signal;
    conveying the target received periodic signal to a transmitter within said target transceiver by way of a hardwired loop connect;
    retransmitting the target received periodic signal to said beacon transceiver as a return periodic signal;
    sampling data points of said return periodic signal, a receiver in said beacon transceiver providing a signal strength measurement for said return periodic signal directly to a microprocessor in said beacon transceiver;
    calculating a phase differential between the original periodic signal and the returned periodic signal correlating to a distance separation range between said beacon transceiver and said target transceiver based on the signal strength measurements without adjusting a gain loop of the receiver; and
    wherein said distance separation is determined in spite of intermediate obstructions and without reliance on GPS, clock synchronization, or line of sight.

2. The process of claim 1 wherein said return periodic signal is sampled for a duration to yield between 100 and 10,000 of said data points.

3. The process of claim 2 wherein the frequency of said periodic original signal is between 10 and 2400 kiloHertz.

4. The process of claim 1 wherein the calculated phase differential between the periodic original signal and the return periodic signal is derived from each of the sampling data points by at least one of average or medium, regression fitting, combinatorial optimization, random optimization, stochastic approximation routines, and quadratic optimization routines.

5. The process of claim 1 wherein the periodic original signal is a sine wave.

6. The process of claim 1 wherein the periodic original signal is an amplitude modulation signal.

7. The process of claim 1 wherein said beacon transceiver transmits the periodic original signal on a first channel and receives the returned periodic signal on a second channel.

8. The process of claim 1 wherein sampling data points of the returned periodic signal occurs at a sampling rate at least twice the frequency of the original signal.

9. The process of claim 1 wherein data points associated with extrema of the returned periodic signal are discarded prior to calculating the distance separation range from the data points.

10. The process of claim 1 further comprising applying an error band to the data points to discard those data points with an error between the periodic original signal and the return signal beyond a preselected band prior to calculating the distance separation range therefrom.

11. The process of claim 10 further comprising applying an average filter to the distance separation range calculated.

12. The process of claim 11 further comprising using the average filter to modify the extent of said error band.

\* \* \* \* \*